US010286766B2

(12) United States Patent
Farmer et al.

(10) Patent No.: US 10,286,766 B2
(45) Date of Patent: May 14, 2019

(54) TAILGATE ASSEMBLY FOR A VEHICLE BODY

(71) Applicant: Honda Motor Co., Ltd., Tokyo (JP)

(72) Inventors: Shalette M. Farmer, Bellefontaine, OH (US); Michael N. Peterson, Dublin, OH (US); Austin B. Kimbrell, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 72 days.

(21) Appl. No.: 15/591,153

(22) Filed: May 10, 2017

(65) Prior Publication Data

US 2018/0326830 A1    Nov. 15, 2018

(51) Int. Cl.
  *B60J 10/25* (2016.01)
  *B62D 35/00* (2006.01)
  *B60J 5/10* (2006.01)
  *B60J 10/84* (2016.01)

(52) U.S. Cl.
  CPC ............ *B60J 10/25* (2016.02); *B60J 5/107* (2013.01); *B60J 10/85* (2016.02); *B62D 35/007* (2013.01)

(58) Field of Classification Search
  CPC ........ B60J 10/70; B60J 10/25; B60J 10/0048; B60J 10/20; B60J 10/34; B60J 10/84; B60J 1/003; B60J 10/248; B60J 10/777; B62D 35/00; B62D 35/007; B62D 35/001; B62D 35/02; B62D 37/02; B62D 35/005; B62D 35/008; B62D 25/16
  USPC ..... 296/180.1, 201, 1.08, 76, 84.1; 424/488, 424/490, 493–495; 505/225, 226, 231, 505/340, 341, 346
  See application file for complete search history.

(56) References Cited

U.S. PATENT DOCUMENTS

| 2,528,264 | A |   | 10/1950 | Coppock et al. |
|---|---|---|---|---|
| 5,154,028 | A | * | 10/1992 | Hill .......................... B60J 10/248 296/201 |
| 5,935,356 | A | * | 8/1999 | Soldner ................ C03C 27/048 156/108 |
| 8,146,979 | B2 |   | 4/2012 | Renke et al. |

(Continued)

FOREIGN PATENT DOCUMENTS

| DE | 9319331 | 2/1994 |
|---|---|---|
| DE | 10348444 | 6/2005 |

(Continued)

*Primary Examiner* — D Glenn Dayoan
*Assistant Examiner* — Sunsurraye Westbrook
(74) *Attorney, Agent, or Firm* — Rankin, Hill & Clark LLP

(57) ABSTRACT

A tailgate assembly for an associated vehicle body includes a tailgate body movable between a closed condition and an open condition with respect to the associated vehicle body. A spoiler is secured to the tailgate body and includes an upper portion configured to overhang in a cantilever fashion from the tailgate body and opposed side portions. A seal molding is adhered to one of the side portions and extends along a side edge of the one side portion. The seal molding has an extension portion that in the closed condition of the tailgate body is located in a gap between the one side portion and an adjacent body member of the associated vehicle body. The extension portion together with the one side portion defines a water channel that opens outwardly with respect to the associated vehicle body for directing water away from the tailgate body.

20 Claims, 7 Drawing Sheets

(56) References Cited

U.S. PATENT DOCUMENTS

| | | | | |
|---|---|---|---|---|
| 8,695,292 | B2* | 4/2014 | Recker | B60J 10/345 |
| | | | | 296/93 |
| 9,205,786 | B2* | 12/2015 | Takayama | B60R 13/04 |
| 9,216,633 | B2* | 12/2015 | Payne | B60J 10/0048 |
| 2015/0008699 | A1* | 1/2015 | Yamaguchi | B62D 35/007 |
| | | | | 296/180.1 |
| 2015/0291232 | A1* | 10/2015 | Watanabe | B60J 5/101 |
| | | | | 296/180.1 |
| 2015/0307065 | A1* | 10/2015 | Kim | B60S 1/52 |
| | | | | 296/180.1 |
| 2016/0009323 | A1* | 1/2016 | Yamaguchi | B62D 35/007 |
| | | | | 296/180.1 |
| 2016/0200184 | A1* | 7/2016 | Inai | B60J 10/84 |
| | | | | 49/476.1 |

FOREIGN PATENT DOCUMENTS

| | | |
|---|---|---|
| FR | 2727906 | 6/1996 |
| FR | 2857911 | 1/2005 |
| FR | 2890032 | 3/2007 |
| JP | 3161451 | 4/2001 |

\* cited by examiner

TAILGATE ASSEMBLY FOR A VEHICLE BODY

BACKGROUND

Vehicles bodies comprise several components, such as body panels, windows, and closures, which form the exterior of the vehicle. Because vehicles are exposed to water, particulates, and wind during operation, a seal between two of the components to cover a gap that is formed between the components is desirable to maintain a dry, clean, and quiet cabin for occupants.

BRIEF DESCRIPTION

According to one aspect, a tailgate assembly for an associated vehicle body comprises a tailgate body movable between a closed condition and an open condition with respect to the associated vehicle body. A spoiler is secured to the tailgate body and includes an upper portion configured to overhang in a cantilever fashion from the tailgate body and opposed side portions. A seal molding is adhered to one of the side portions and extends along a side edge of the one side portion. The seal molding has an extension portion that in the closed condition of the tailgate body is located in a gap between the one side portion and an adjacent body member of the associated vehicle body. The extension portion together with the one side portion defines a water channel that opens outwardly with respect to the associated vehicle body for directing water away from the tailgate body.

According to another aspect, a spoiler is provided for an associated tailgate body that is movable between a closed condition and an open condition relative to an associated vehicle body. The spoiler comprises an upper portion and opposed side portions. A seal molding is adhered to and extends along a side edge of each of the side portions. Each seal molding has an extension portion extending outwardly from the edge. Each extension portion together with the edge of each side portion defines a water channel that opens outwardly with respect to the associated vehicle body. The water channel is adapted to direct water away from the associated tailgate body.

DETAILED DESCRIPTION

It should, of course, be understood that the description and drawings herein are merely illustrative and that various modifications and changes can be made in the structures disclosed without departing from the present disclosure. As used herein, lateral directions are transverse across the vehicle body, i.e., left and right directions. Likewise, longitudinal directions refer to forward and rearward directions of vehicle travel, and the vertical directions relate to elevation, i.e., upward and downward directions.

Figure 1:
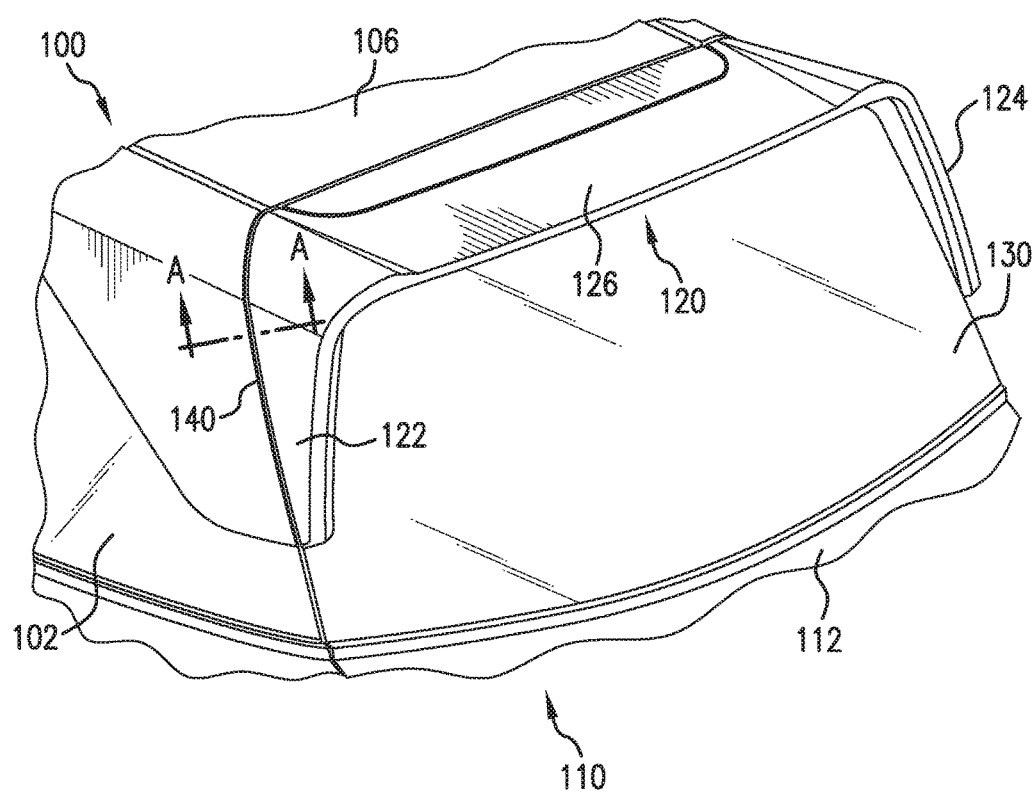
FIGS. 1 and 2 are partial rear perspective views of a tailgate assembly for a vehicle body, the tailgate assembly including a spoiler and a seal molding according to the present disclosure.
Figure 2:
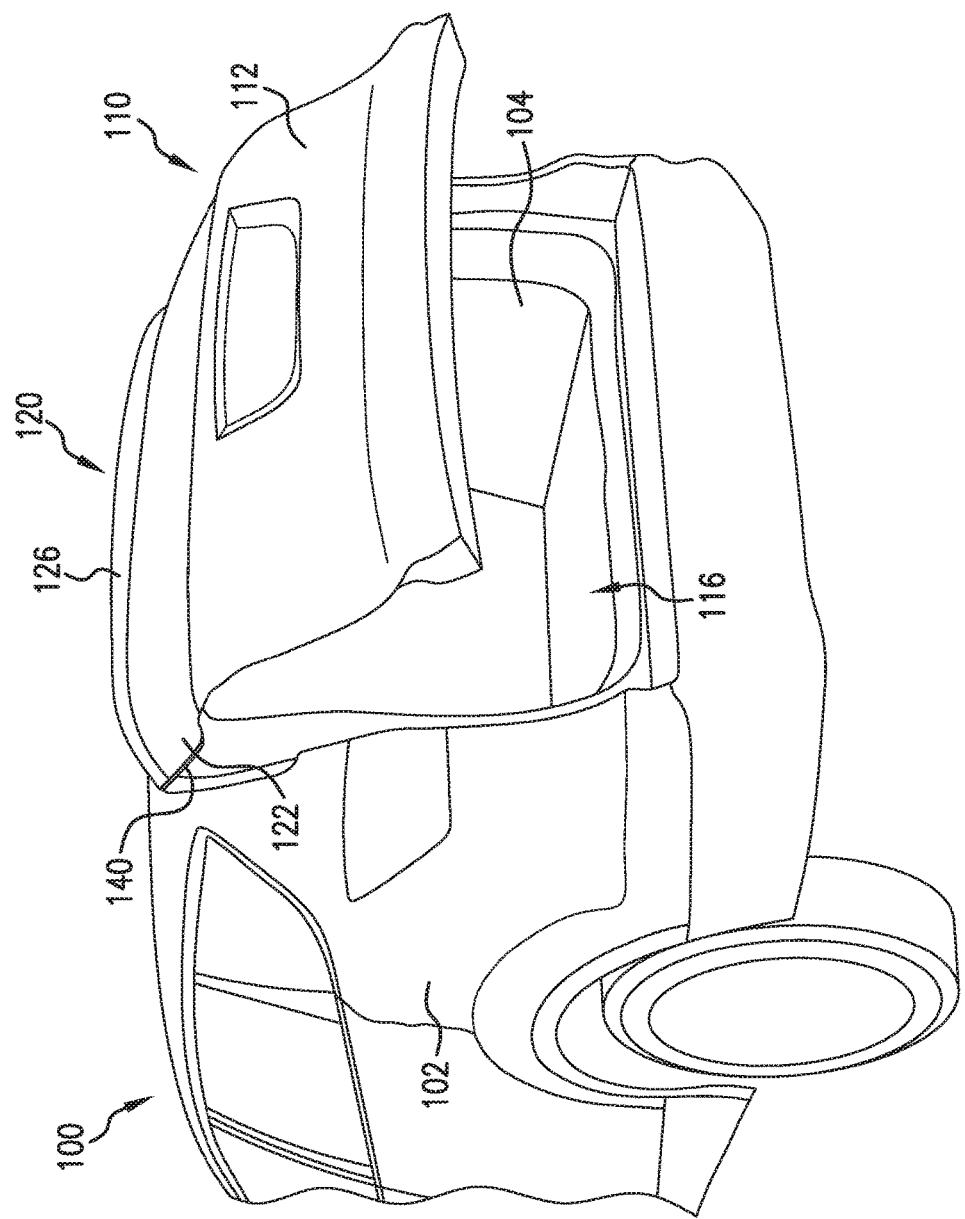

Turning first to FIGS. 1 and 2, there is shown a rear portion of a vehicle body 100. The vehicle body 100 generally includes laterally spaced side panel outers 102, 104, a roof panel 106, and a tailgate assembly 110. The tailgate assembly 110 includes a tailgate body 112 that rotates about an upper, generally horizontal axis between a closed condition and an open condition with respect to the vehicle body 100 to allow ingress and egress to a rear portion of a vehicle interior 116. A spoiler 120 is secured to the tailgate body 112, and as depicted along an upper perimeter portion thereof. The spoiler 120 can include laterally spaced side portions 122, 124 and an upper portion 126. These components of the spoiler 120 can be manufactured as separate components, e.g. plastic injection molded components, which are molded, painted, and then assembled to the tailgate body 112. The side portions 122, 124 of the spoiler 120 extend along an upper portion of the respective perimeter side edges of the tailgate body 112, for example along opposite edges of a rear window 130 incorporated into the tailgate body. Similarly, the upper portion 126 of the spoiler 120 is secured or mounted to the tailgate body 112 at a region above an upper edge of the window 130, and is configured to overhang in a cantilever fashion from the tailgate body 112. As a result of injection molding these spoiler components, a desired contour of the spoiler 120 and fit of the spoiler with the tailgate body 112 can be achieved. For example, the spoiler 120 is an extension of the roofline of the rear portion of the vehicle body 100 and an extension of upper portions of the side panel outers 102, 104 of the vehicle body 100 adjacent the tailgate body 112 for purposes of streamlining the contour, and exerting less drag on the vehicle.

Figure 3:
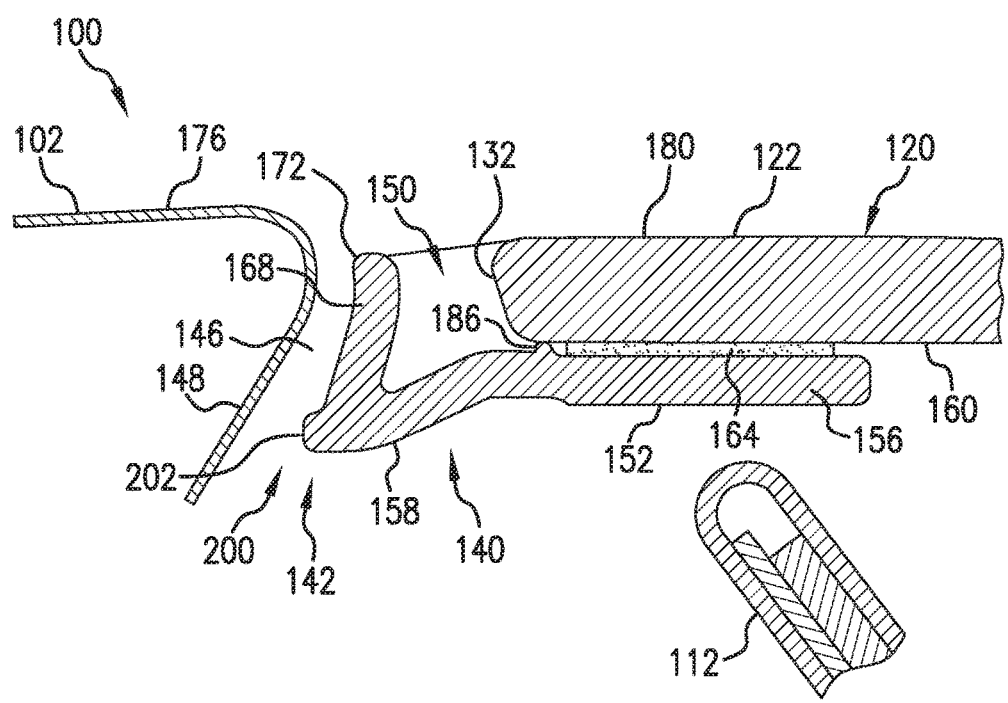
FIG. 3 is a cross-sectional view taken along line A-A of FIG. 1.

A seal molding 140 according to the present disclosure is fixedly attached to each of side portions 122, 124 and extends along a side edge of the each side portion. The features of the exemplary seal molding 140 will be described with reference to FIG. 3, which depicts the seal molding 140 provided on the side edge 132 of the side portion 122. It should be appreciated that the seal molding 140 for the side portion 124 is similarly constructed. As depicted, the seal molding 140 has an extension portion 142 that in the closed condition of the tailgate body 112 is located in a gap 146 between the side portion 122 and an adjacent body member (e.g., a flange structure 148 of the side panel outer 102) of the vehicle body 100. The extension portion 142 together with side edge 132 of the side portion 122 defines a water channel 150 that opens outwardly and laterally with respect to the vehicle body 100 for directing water away from the tailgate body 112 in both its open condition and closed condition.

In the illustrated aspect, the seal molding 140 includes a bottom wall 152 having a first portion 156 and a second portion 158. The first portion is adhered to an inside surface 160 of the side portion 122. By way of example, a double-sided tape 164 is placed on the first portion 156 of the seal molding 140 and the inside surface 160 of the side portion 122 is brought into abutment with the first portion 156. It should be appreciated that alternative manners for securing the seal molding 140 to the side portion 122 are contemplated. As shown, the extension portion 142 of the exemplary seal molding 140 is generally L-shaped, and according to one aspect, the extension portion 142 is defined by the second portion 158 of the bottom wall 152 and a second wall 168 extending outwardly from the second portion 158. The bottom wall 152 can be angled inwardly toward the tailgate body 112 and the second wall 168 can extend toward the side edge 132 of the side portion 122 with its distal end 172 offset inwardly from respective outer surfaces 176, 180 of the side panel outer 102 and the side portion 122. With this orientation of the second portion 158 and the second wall 168, the extension portion 142 is configured so that a width of a lower portion of the water channel 150 is greater than a width of an upper portion of the water channel 150 and a depth of the water channel 150 adjacent the second wall 168 is greater than a depth of the water channel adjacent the side edge 132 of the side portion 122. According to another aspect, the seal molding 140 can further include a rib 186 provided on the bottom wall 152. The rib 186 is adapted to sealingly engage the inside surface 160 of the side portion 122 outwardly of the adhesive connection between the side portion 122 and seal molding 140, which isolates water within the water channel from the adhesive connection. Therefore, the rib 186 can further define the water channel 150.

According to the present disclosure, in the closed condition of the tailgate body 112 the extension portion 142 is configured to include a wind noise reduction feature 200 for air moving through the gap 146 between the side portion 122 and the adjacent body member (i.e., the flange structure 148 of the side panel outer 102). In the depicted aspect of the seal molding 140, the wind noise reduction feature 200 is defined by a protuberance 202 extending into the gap 146 toward the flange structure 148. The protuberance 202 is located adjacent an intersection of the second portion 158 of the bottom wall 152 and the second wall 168, which is offset inwardly from an end of the second portion 158 toward the side edge 132 of the side portion 122. It should be appreciated that the protuberance 202 can be defined by one of the end of the second portion 158 located outwardly of the second wall 168 and by a portion of the second wall 168.

Figure 4:
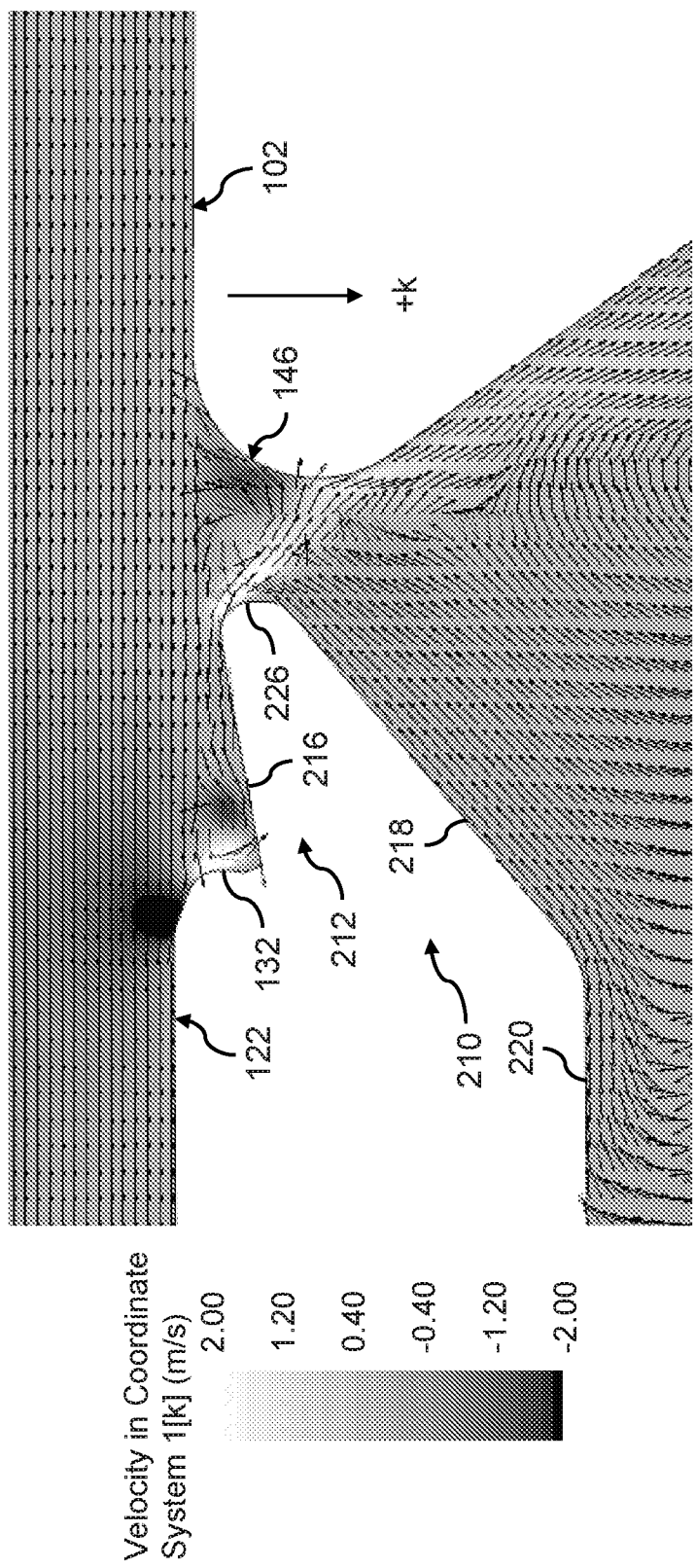
FIG. 4-7 illustrate static pressure/resulting airflow of the exemplary spoiler seal molding compared to a known spoiler seal molding.
Figure 5:
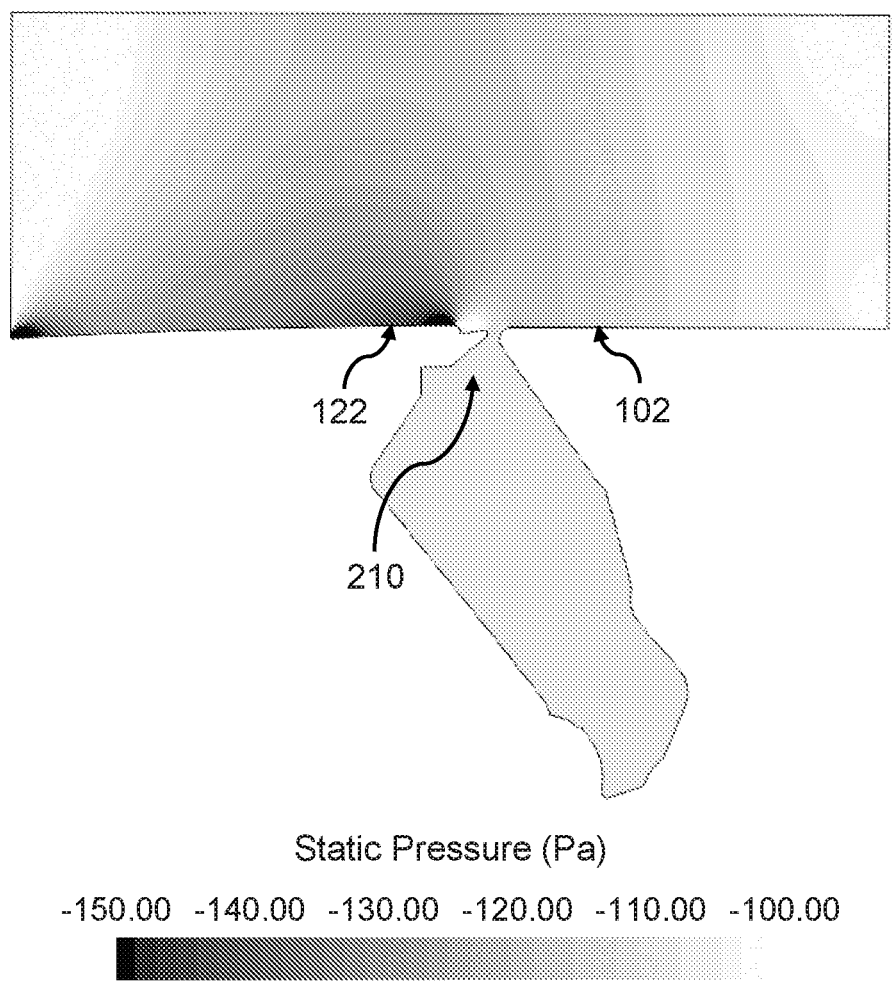
Figure 6:
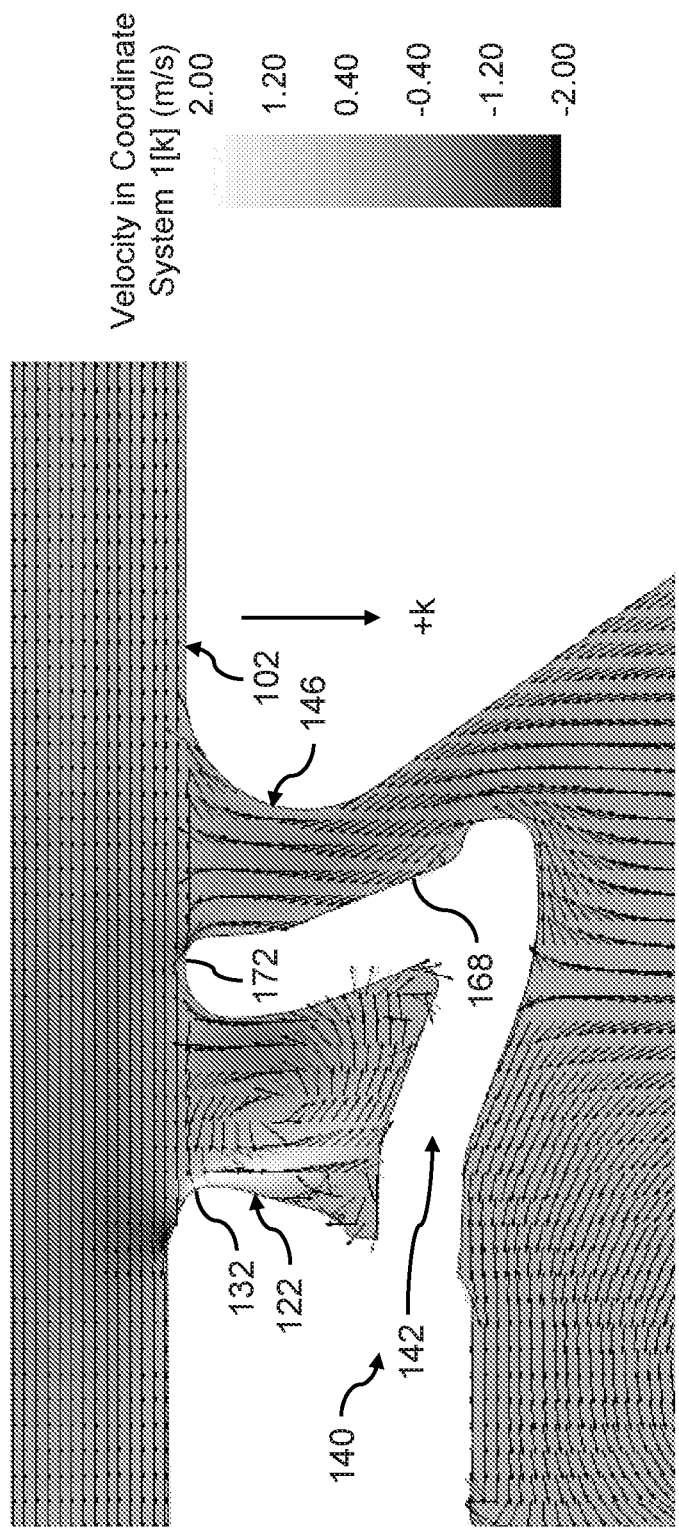
Figure 7:
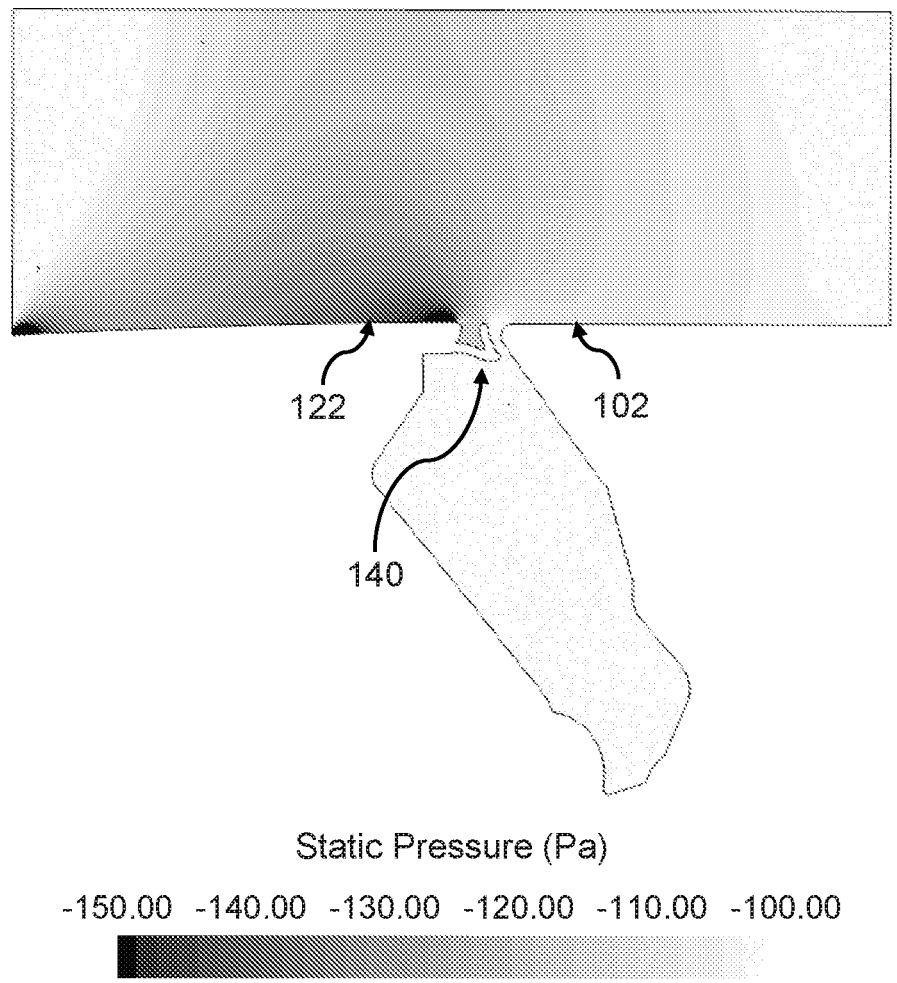

FIG. 4 illustrates airflow along the side panel outer 102 toward the spoiler side portion 122 which has a known seal molding 210 adhered thereto. FIG. 5 illustrates a distribution of air pressure around the spoiler side portion 122 and known seal molding 210. The known seal molding 210 includes a generally triangular shaped extension portion 212 that projects into the gap 146 between the side panel outer 102 and the side portion 122. The extension portion 212 includes a first side wall 216 offset inwardly from the outer surface 180 of the side portion 122 and a second side wall extending angularly from a bottom wall 220 toward the side panel outer 102. The first and second side walls 216, 218 converge at a distal end 226 of the extension portion 212. As depicted in FIG. 4, airflow impingement occurs at the distal end 226 and the side edge 132 of the side portion 122. FIG. 5 shows the pressure differential between an area laterally outside of the extension section 212 and an area of the gap 146. The increased negative static pressure in the area of the gap causes the impinging airflow to at least partially flow through the gap 146 toward the vehicle interior, and this leads to unwanted wind noise or wind whistle at the known seal molding 210. FIG. 6 illustrates airflow along the side panel outer 102 toward the spoiler side portion 122 which has the exemplary seal molding 140 adhered thereto. With the location of the distal end 172 of the second wall 168 of the extension portion air impingement at the seal molding 140 and side portion 122 is minimized. FIG. 7 illustrates a distribution of air pressure around the spoiler side portion 122 and the exemplary seal molding 140. In contrast to the known design, an increased negative static pressure occurs in an area laterally outside of the extension portion 142. With the correspondingly decreased negative static pressure in the area of the gap 146 (and the spacing between side panel outer 102 and the extension portion 142 being narrowed by the wind noise reduction feature 200), airflow can be caused to at least partially flow through the gap 146 toward the exterior of the vehicle body. Therefore, with the exemplary seal molding 140 wind noise or wind whistle at the seal molding 140 can be prevented or at least reduced to a negligible level. Accordingly, the wind noise reduction feature 200 is configured to prevent airflow ingress into the area of the gap 146 between the side panel outer 102 and the side portion 122 by creating a favorable pressure differential between an area laterally outside of the extension section (i.e., along the outer surface 175 of the side panel outer 102) and the gap 146.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A tailgate assembly for an associated vehicle body comprising:
    a tailgate body movable between a closed condition and an open condition with respect to the associated vehicle body;
    a spoiler secured to the tailgate body and including an upper portion configured to overhang in a cantilever fashion from the tailgate body and opposed side portions; and
    a seal molding adhered to one of the side portions and extending along a side edge of the one side portion, the seal molding having an extension portion that in the closed condition of the tailgate body is located in a gap between the one side portion and an adjacent body member of the associated vehicle body, wherein the extension portion together with the one side portion defines a water channel that opens outwardly with respect to the associated vehicle body for directing water away from the tailgate body.

2. The assembly of claim 1, wherein the seal molding includes a bottom wall having a first portion adhered to an inside surface of the one side portion and a second portion, wherein the extension portion of the seal molding is defined by the second portion of the bottom wall and a second wall extending laterally from the second portion.

3. The assembly of claim 2, wherein the second portion of the bottom wall is angled inwardly toward the tailgate body and the second wall extends toward the edge of the one side portion.

4. The assembly of claim 3, wherein extension portion is configured so that a width of a lower portion of the water channel is greater than a width of an upper portion of the water channel and a depth of the water channel adjacent the second wall is greater than a depth of the water channel adjacent the edge of the one side portion.

5. The assembly of claim 2, wherein the seal molding includes a rib provided on the bottom wall, the rib sealingly engages the inside surface of the one side portion outwardly of the adhesive connection, the rib further defines the water channel.

6. The assembly of claim 2, wherein the second portion of the bottom wall and the second wall together are generally L-shaped and define the extension portion.

7. The assembly of claim 2, wherein in the closed condition of the tailgate body the extension portion is configured to include a wind noise reduction feature for air moving through the gap between the one side portion and the adjacent body member.

8. The assembly of claim 7, wherein the wind noise reduction feature is defined by a protuberance extending toward the adjacent body member.

9. The assembly of claim 8, wherein the second wall is offset inwardly from an end of the second portion of the bottom wall, the protuberance is defined by the end of the second portion located outwardly of the second wall.

10. The assembly of claim 8, wherein the protuberance is located adjacent an intersection of the second wall and the second portion of the bottom wall and is defined by a portion of the second wall.

11. The assembly of claim 7, wherein the wind noise reduction feature is configured to prevent airflow ingress into the gap between the one side portion and the adjacent body member.

12. The assembly of claim 11, wherein the wind noise feature is configured so that a favorable pressure differential is created between an area laterally outside of the extension portion and the gap.

13. The assembly of claim 1, wherein in the closed condition of the tailgate body an entirety of the extension portion is spaced from the adjacent body member.

14. A spoiler for an associated tailgate body that is movable between a closed condition and an open condition relative to an associated vehicle body, the spoiler comprising:
an upper portion and opposed side portions; and
a seal molding adhered to and extending along a side edge of each of the side portions, each seal molding having an extension portion extending outwardly from the edge, wherein each extension portion together with the side edge of each side portion defines a water channel that opens outwardly with respect to the associated vehicle body, the water channel adapted to direct water away from the associated tailgate body.

15. The spoiler of claim 14, wherein the seal molding includes a bottom wall having a first portion secured to an inside surface the side portion and a second wall angled toward the bottom wall, a second portion of the bottom wall and the second wall together are generally L-shaped and define the extension portion.

16. The spoiler of claim 15, wherein the extension portion is configured to include a wind noise reduction feature.

17. The spoiler of claim 16, wherein the wind noise reduction feature is configured to prevent airflow ingress into a gap between each side portion and the adjacent vehicle body by creating a pressure differential between an area laterally outside of each extension section and the gap.

18. The spoiler of claim 16, wherein the wind noise reduction feature is defined by a protuberance extending into the gap.

19. The spoiler of claim 18, wherein the second wall is offset inwardly from an end of the second portion of the bottom wall, the protuberance is defined by the end of the second portion located outwardly of the second wall.

20. The spoiler of claim 18, wherein the protuberance is located adjacent an intersection of the second wall and the second portion of the bottom wall and is defined by a portion of the second wall.

* * * * *